United States Patent [19]

Sampara et al.

[11] Patent Number: 5,476,681
[45] Date of Patent: Dec. 19, 1995

[54] RIGID POLYURETHANE/POLYISOCYANURATE FOAMS CONTAINING PARAFFINIC BASED OILS

[75] Inventors: Agus Sampara, Toronto; Rob Hutchings, Blackie; Tom Harris, Toronto; Karl Dondoroff, Toronto; Kerry Bowman, Toronto, all of Canada

[73] Assignee: BASF Corporation, Mt. Olive, N.J.

[21] Appl. No.: 368,111

[22] Filed: Jan. 3, 1995

Related U.S. Application Data

[62] Division of Ser. No. 872,226, Apr. 22, 1992, Pat. No. 5,405,885.

[51] Int. Cl.$^6$ ............................... B32B 35/00; B05D 5/00
[52] U.S. Cl. ..................... 427/140; 427/244; 427/373; 427/393; 427/421
[58] Field of Search ................................ 427/140, 244, 427/373, 393, 397, 421

[56] References Cited

U.S. PATENT DOCUMENTS

| | | | |
|---|---|---|---|
| 4,008,788 | 2/1977 | Whitt | 184/12 |
| 4,048,103 | 9/1977 | Graham | 427/140 |
| 4,183,996 | 1/1980 | Kremer et al. | 427/443 |
| 4,207,128 | 6/1980 | Traübel et al. | 427/244 |
| 4,376,171 | 3/1983 | Blount | 427/105 |
| 4,584,233 | 4/1986 | Meader et al. | 427/140 |
| 4,661,532 | 4/1987 | Morin | 521/167 |
| 4,865,879 | 9/1989 | Finlay | 427/140 |
| 4,877,829 | 10/1989 | Vu et al. | 427/136 |
| 5,001,190 | 3/1991 | Carpenter et al. | 427/140 |
| 5,250,651 | 10/1993 | Price | 528/59 |
| 5,405,885 | 4/1995 | Sampara et al. | 521/132 |

*Primary Examiner*—Diana Dudash
*Attorney, Agent, or Firm*—Dennis V. Carmen

[57] ABSTRACT

The invention is a rigid polyurethane foam to which a base stock lubricating oil made of at least 55 weight percent paraffinic carbons and less than 10 weight percent aromatic carbons has been added as a hydrophobic agent protecting the polyurethane foam from reacting with environmental moisture. The foam is useful for deposit in railroad spike holes or any structural member having a cavity and where moisture within or on the cavity would otherwise react with the isocyanate to produce an uncontrollable foaming mass.

19 Claims, No Drawings

RIGID POLYURETHANE/POLYISOCYANURATE FOAMS CONTAINING PARAFFINIC BASED OILS

This is a division of application Ser. No. 07/872,226, filed Apr. 22, 1992, now U.S. Pat. No. 5,405,885.

FIELD OF THE INVENTION

The present invention relates to rigid polyurethane/polyisocyanurate foams used to fill cavities, and more particularly to polyurethane/polyisocyanurate rigid foams containing paraffinic based oils used to fill cavities containing water at predetermined densities.

BACKGROUND OF THE INVENTION

Considerable attention has been directed toward repairing rather than replacing structural components, such as railroad ties, as a more efficient economic means for extended use of the whole structure. When a section of rail needs replacing or during routine maintenance of the railroad, the rail is detached from the ties by removing the spikes and tie plates, leaving behind railroad ties having spike holes.

Before these railroad ties can be re-used, the spike holes must be plugged to provide the tie with structural integrity and prevent water from accumulating within the hole and rotting the wood. Various methods to plug spike holes have been proposed, including driving wooden dowels or metal inserts through the hole. These methods, however, are labor intensive and often leave gaps between the insert and tie through which water can accumulate and deteriorate the wood.

An alternative approach suggested in the art is to plug the spike holes with a high density rigid polyurethane foam. As pointed out in U.S. Pat. No. 4,661,532 to Morin, however, the presence of environmental water or moisture in the hole causes the injected polyurethane composition to foam uncontrollably resulting in an undesirable low density foamed mass having low strength. As a solution to this problem, Morin proposed using a urethane composition made hydrophobic by adding a coal tar or a coal tar pitch to the urethane composition, thereby repelling any environmental water present and preventing the water from reacting with the foam ingredients. However, coal tar pitch is predominately composed of polynuclear aromatic compounds among which are volatile components carcinogenic to humans such as anthracene, phenanthrene, and acridine. Likewise, coal tar is a known carcinogen and contains numerous aromatic volatiles toxic by inhalation.

Consequently, the inventors herein have set out to search for a suitable alternative to coal tar based rigid polyurethane foam compositions which will prevent the urethane composition from reacting with environmental water or moisture on or in the application site while reducing the carcinogenic health risks associated with the aromatic compounds contained within coal tar.

SUMMARY OF THE INVENTION

The inventors have discovered a hydrophobic polyurethane/polyisocyanurate composition which does not use coal tar or coal tar pitch and which can be used to fill defects in structural members in a controlled fashion at predetermined densities. The rigid polyurethane/polyisocyanurate composition of the invention is obtained by reacting an organic polyisocyanate with a polyol composition comprising a compound having at least two isocyanate reaction hydrogens, a lubricating oil comprising a base stock having at least 55 weight percent carbon atoms in paraffinic form and no more than 10 weight percent carbon atoms in aromatic form, a foaming agent, a urethane promoting catalyst, and optionally crosslinkers, surfactants, emulsifiers, and/or a trimerization catalyst to promote the formation of the isocyanurate structure.

The paraffinic based oil used in the invention comprises a mixture of paraffinic and naphthenic hydrocarbons and advantageously contains only trace amounts of aromatic hydrocarbons. The oil employed in the invention repels environmental water and deters it from reacting with the foaming composition. With the polyurethane/polyisocyanurate composition of the invention, one may formulate a system to a predetermined density and expect the foaming mass injected into a defect containing environmental water have no greater than a 20 percent error from the predetermined foam density.

DETAILED DESCRIPTION OF THE INVENTION

The rigid polyurethane/polyisocyanurate foam of the invention can be used in repair applications where environmental moisture is a concern, such as the repair of wooden hydropoles, railroad spike holes, roofing, and mining. By using a lubricating oil in the rigid polyurethane system, the foaming reaction occurs in a controlled manner such that the variance in free rise densities between a foam reacted in a dry environment and a foam reacted in the presence of environmental water is not greater than about 20 percent, preferably not greater than 15 percent, more preferably not greater than 5 percent, most preferably not greater than 3 percent. The density variant comparisons between the foam density in a dry environment and in a wet environment, as defined herein, are evaluated on the basis of pouring the foam ingredients into a 285 ml cup without water and poured into a 185 ml cup with 10 grams of water, at room temperature and comparing the cup densities of each.

The rigid polyurethane/polyisocyanurate foam of the invention may be divided prior to reaction into an organic polyisocyanate side and a polyol composition side containing the compound having at least two reactive hydrogens such as a polyol and the lubricating oil. Instead of adding the lubricating oil to the polyol composition, the lubricating oil may optionally be added to and contained in the organic polyisocyanate side. While not being bound to a theory, it is believed that the polyisocyanate polyol and polyisocyanate water reactions are highly favored over any potential polyisocyanate oil reaction. Thus, it is believed that the paraffinic based oil does not participate chemically in the polyurethane/polyisocyanurate forming reaction and acts rather as a hydrophobic agent deterring external sources of water from reacting with the polyisocyanate to generate excessive amounts of carbon dioxide.

The lubricating oil used in the present invention is defined as one or more petroleum derived water free base stocks obtained by refining lubricating oil fractions, to which additives may optionally be added in an amount of from 2 to 20 weight percent, and which base stocks contain no more than 10 weight percent carbons in aromatic form and at least 55 weight percent carbons in paraffinic form. To further reduce the hazardous effects of aromatics, it is preferable that the base stock contain no more than 8 weight percent, more preferably no more than 7 weight percent, and most preferably no more than 5 weight percent of carbons in aromatic form. The base stock preferably has a paraffinic content of at least 60 weight percent, more preferably 70 weight percent, and most preferably at least 75 weight percent. As the paraffinic content among base stocks increase, the aromatic and naphthenic content decreases. It is preferred that the base stock paraffinic oil have no more than 34 weight percent naphthenic carbons, more preferably no more than 30 weight percent, most preferably no more than 20 weight percent carbon in naphthenic form. Such lubricating oils of a preferred paraffinic nature are typically derived from crude originating from the Middle East, Aramco, Pennsylvania stock which is highly paraffinic, or from the Mid-Continent which is a mixed paraffinic-naphthenic crude. However, the source of crude is not critical so long as the base stock contains at least 55 weight percent paraffinic carbons and no more than 10 weight percent aromatic carbons.

The lubricating oil used in the invention preferably contains no water. In formulating a polyurethane system to yield a foam at a predetermined density, a calculated amount of blowing agent such as water is added to the system. The unexpected presence of water in the oil will decrease the density beyond the desired density, unless the amount of contaminating water in the oil is known prior to formulating the system. Such foreknowledge, however, might require analytic testing of each oil sample or batch and reformulation to make a foam within the desired density, both steps being unacceptable economic and time hindrances in the mass manufacture and industrial application of the foam system. The paraffinic chains in the lubricating oil may be branched, unbranched, or a mixture of each. Branched paraffins generally have a lower pour point which may be helpful when applying the foaming system in extremely cold weather.

The base stock lubricating oil preferably has a specific gravity of 0.9050 or less, or alternatively an A.P.I. gravity of 28 or greater; a Dean & Davis viscosity index of at least 95; and a minimum Cleveland Open Cup flash point greater than 300° F. for any given viscosity.

The specific gravity of lubricating oils of the same average molecular weight increases in the order of straight chain paraffin, branched paraffin, cycloparaffin (naphthenics), and aromatics. Thus, it is preferable to utilize an oil having a specific gravity of 0.9050 or less, more preferably of 0.8900, most preferably 0.8800 or less according to ASTM D1298-85.

Discounting the effect of optional additives, the viscosity gravity constant of the oils used in the invention is preferably less than 0.85, more preferably less than 0.8 according to ASTM 2501-87.

The viscosity index is also a useful rough measurement helpful to indicate the average composition of the base stock. The viscosity index indicates the relative change in viscosity with temperature. As the temperature rises, viscosity decreases. A high viscosity index indicates that the oil does not thin out at rising temperatures as quickly as oils having a lower viscosity index. The viscosity index (VI) of the paraffinic base stocks used in this invention are preferably from 90 to 105, more preferably from 95 to 105. Those base stocks of naphthenic character typically have V.I. 25 to 70, due to the higher content of aromatics. Paraffinic base stocks have the highest viscosity index, followed by naphthenic oils and lastly aromatic based oils.

The Cleveland Open Cup flash point is also a helpful indicator of the mineral oil composition, since an oil containing a large amount of aromatics, or contaminants such as fuel or fuel oil typically present in used oil, will depress the flash point of the oil. Light mineral oils generally have open up flash points from 300° to 400° F., and heavy mineral oils are in the range of 400°–500° F. It is preferred that the open cup flash point of the oil used in the invention be at least about 320° F., more preferably at least about 430° F., most preferably 450° F.

To the base stock lubricating oil is optionally added an assortment of additives in an amount of from 2 to 20 wt. percent to make a finished oil, such as a motor oil. Large amounts of additive which tend to absorb water are generally to be avoided since it is desirable that the oil be hydrophobic to repel environmental moisture. Typical additives commonly mixed into base stocks include antioxidants, detergents and dispersants, metal passivators, corrosion inhibitors, emulsifying agents, antifoaming agents, viscosity index improvers, pour point depressors, demulsifiers, emulsifiers and emulsifying aids, extreme pressure additives and friction modifiers. Some additives such as polyalkylated aromatics used as rust inhibitors, condensation products of paraffin wax and naphthalene used as pour point depressants will raise the concentration or aromatics in the finished oil. Such raised concentrations are acceptable so long as the base stock for which the additives are mixed does not contain greater than 10 weight percent aromatic carbons, and has a paraffinic concentration of at least 55 weight percent. The preferable lubricating oil employed in the foam is a motor oil for use in internal combustion engines, although any base stock containing oil complying with the paraffinic and aromatic content requirements is also suitable. Suitable motor oils include commercially available S.A.E. 10W-40, 5W-30, 10W-30, 30, or 50 weight oils.

The lubricating cut of regenerated, or re-refined oils may also be employed so long as the contaminants typically contained in used oils, such as water and lighter components such as fuel and fuel oil are distilled off and the oil is further subject to refining to remove excess quantities of aromatics.

The paraffinic based lubricating oil is advantageously admixed with the polyol composition side of the polyurethane/polyisocyanurate system. The polyol composition side includes one or more compounds having at least two isocyanate reactive hydrogens, a blowing agent, a polyurethane forming catalyst, and optionally a surfactant, compatibilizers, crosslinking and a polyisocyanurate promoting catalyst. The isocyanate is reacted with active hydrogen compounds in the polyol composition at an isocyanate to active hydrogen ratio of from 0.5:1 to 10 to 1 or at an index of from 60 to 200, preferably at 95 to 110, most preferably at 100. In the case of polyurethanes which also contain significant quantities of isocyanurate groups, indices greater than 200 to 800 and preferably greater than 300 to 800 may be used in conjunction with a trimerization catalyst and the usual polyurethane catalyst.

Suitable examples of the compound having at least two isocyanate reactive hydrogens include polyols such as polyoxyalkylene polyether polyols, polyoxyalkylene polyester polyols, and graft polyols; polyhydric polythioethers; polyhydroxyl-containing phosphorous compounds; polyacetals; and aliphatic thiols. These compounds have an average functionality of about 2 to 8, preferably about 3 to 8, a theoretical hydroxyl number from about 300 to about 700, and equivalent weights ranging from about 50 to about 1500, preferably 70 to about 150.

Suitable hydroxy-terminated polyester include those obtained, for example, from polycarboxylic acids and polyhydric alcohols. A suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, a-hydromuconic acid, B-hydromuconic acid, a-butyl-a-ethyl-glutaric acid, a,B-diethyl-succinic acid, isophtalic acid, therphthalic acid, phthalic acid, hemimellitic acid, and 1,4-cyclohexanedicarboxylic acid. A suitable polyhydric alcohol may be used such as ethylene glycol, propylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, 1,2,6-hexanetriol, a-methyl glucoside, sucrose, and sorbitol. Also included within the term "polyhydric alcohol" are compounds derived from phenol such as 2,2-bis(4-hydroxyphenyl)-propane, commonly known as Bisphenol A.

Preferably used are polyoxyalkylene polyether polyols. Suitable polyoxyalkylene polyether polyols include the polymerization product of an alkylene oxide with a polyhydric alcohol. Suitable polyhydric alcohols include those disclosed above for use in the preparation of the hydroxy-terminated polyesters. Any suitable alkylene oxide may be used such as ethylene oxide, propylene oxide, butylene oxide, amylene oxide, and mixtures of these oxides, preferably propylene oxide. Polyoxypropylene polyether polyols are more hydrophobic than their ethylene oxide counterparts. The polyalkylene polyether polyols may be prepared from other starting materials such as tetrahydrofuran and alkylene oxide-tetrahydrofuran mixtures; epihalohydrins such as epicholorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4 tetramethylene and polyoxyethylene glycols, and copolymer glycols prepared from blends or addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Extensive lists of suitable polyol may be found in columns 2 and 3 of U.S. Pat. No. 3,652,639; columns 2–6 of U.S. Pat. No. 4,421,872; and columns 4–6 of U.S. Pat. No. 4,310,632, these three patents being hereby incorporated by reference.

Polyethers which are preferred include the alkylene oxide addition products of trimethylolpropane, glycerine, sucrose, sorbitol, propylene glycol, dipropylene glycol, pentaerythritol, and 2,2-bis (4-hydroxyphenyl)-propane and blends thereof having equivalent weights of from 100 to 5000.

Suitable amines which may be condensed with alkylene oxides include aromatic amines such as aniline, N-alkylphenylenediamines, 2,4'-,2,2'-, and 4,4'-methylenedianiline, 2,6- or 2,4 -toluenediamine, vicinal toluenediamines, o-chloro-aniline, p-aminoaniline, 1,5-diaminonaphthalene, methylene dianiline, the various condensation products of aniline and formaldehyde, and the isomeric diaminotoluenes; and aliphatic amines such as monodi-, and trialkanolamines, ethylene diamine, propylene diamine, diethylenetriamine, methylamine, triisopropanolamine, 1,3-diaminopropane, 1,3-diaminobutane, and 1,4-diaminobutane. Preferable amines include monoethanolamine, vicinal toluenediamines, ethylenediamines, and propylenediamine.

Suitable polyhydric polythioethers which may be condensed with alkylene oxides include the condensation product of thiodiglycol or the reaction product of a dicarboxylic acid such as is disclosed above for the preparation of the hydroxyl containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a P205 equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two-SH groups such as 1,2-ethanedithiol, 1,2-propanedithiol, 1,2-propanedithiol, and 1,6-hexanedithiol; alkene thiols such as 2 -butene-1,4-dithiol; and alkyne thiols such as 3-hexyne-1,6 -dithiol.

Also suitable as the polyol are polymer modified polyols, in particular, the so-called graft polyols. Graft polyols are well known to the art and are prepared by the in situ polymerization of one or more vinyl monomers, preferably acrylonitrile and styrene in the presence of a polyether or polyester polyol, particularly polyols containing a minor amount of natural of induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 4,524,157; all of which patents are herein incorporated by reference.

Non-graft polymer modified polyols are also preferred, for example, those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

Organic polyisocyanates which may be employed include aromatic, aliphatic, and cycloaliphatic polyisocyanates and combinations thereof. Examples of such isocyanates may found on columns 8 and 9 of U.S. Pat. No. 4,690,956, herein incorporated by reference. Representative polyisocyanates are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4 diisocyanate, hexahydrotoluene diisocyanate (and isomers), naphthalene-1,5-diisocyanate, 1 -methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate, and mixtures thereof. Especially useful due to their availability and properties are 4,4'-diphenylmethane diisocyanate, polymethylene polyphenylene polyisocyanate, or mixtures thereof for rigid foams, or a mixture of the foregoing with toluene diisocyanates for semi-rigid foams.

Crude polyisocyanates may also be used in the compositions of the present invention, such as crude toluene diisocyanate obtained by the phosgenation of a mixture of toluenediamines or crude diphenylmethane isocyanate obtained by the phosgenation of crude diphenylmethane diamine. Such crude isocyanates are disclosed in U.S. Pat. No. 3,215,652, herein incorporated by reference.

The rigid polyurethane/polyisocyanurate foam of the invention requires a blowing agent to effect foaming. Suitable blowing agents are those of the reactive type such as water, formic acid, or tertiary alcohols; physically active blowing agents having a boiling point below 28 degrees C. and which vaporize at or below the temperature of the foaming mass comprising chlorofluorocarbons having at least one hydrogen (soft CFC's) and volatile hydrocarbons, or mixtures thereof. Soft CFC's useful herein are those having an ozone depletion potential of less than 0.2 including 1,1,1 trichloroethane, 1,1,1,2-tetrafluoroethane, HCFC-141b, HCFC-22, HCFC-123, and HCFC-142b. Volatile hydrocarbons include butane, pentane, hexane, heptane, cyclopentane, cyclohexane, pentene, and heptene.

It is preferable to employ water as the exclusive blowing agent, in which case the polyisocyanate component is proportionately increased. The amount of reactive blowing agent, preferably water, is from 0.01 to 8.0 weight percent based on the weight of the polyol composition, preferably 0.01 weight percent to 2 weight percent, more preferably 0.01 weight percent to 1.0 weight percent based the weight of the polyol composition. Physically active blowing agents are employed in amounts of from 3 weight percent to 30 weight percent based on the weight of the polyol composition, preferably 10 weight percent to 25 weight percent.

Catalysts for producing the rigid polyurethane foam are optional and include compounds that greatly accelerate the reaction of the active hydrogen containing compounds with the organic optionally modified polyisocyanates. Examples include organic metal compounds, preferably organic tin compounds such as tin (II) salts of organic carboxylic acids, e.g., tin(II) acetate, tin(II) octoate, tin(II) ethylhexoate and tin(II) laurate, as well as the dialkyline(IV) salts of organic carboxylic acids, e.g., dibutyltin diacetate, dibutyltin maleate and dioctylin diacetate. Organometallic compounds useful as catalysts are generally disclosed in U.S. Pat. No. 2,846,408, herein incorporated by reference. The organic metal compounds are used alone or preferably in combination with strong basic amines. Examples include amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N,',N'-tetramethylethylenediamine, N,N,N',N'-tetramethylbutanediamine, pentamethyldiethylentriamine, tetramethyldiaminoethyl ester bis(dimethylaminopropyl) urea, dimethylpiperazine, 1,2-dimethylimidazle, 1-aza-bicyclo[3.3.0]octane and preferably 1,4 -diazabicyclo[2.2.2]octane and alkanolamine compounds such as triethanolamine, triisopropanolamine, N-methyl-and N-ethyldiethanolamine and dimethylethanolamine.

Suitable catalysts also include tris(dialkylamino)-s-hexahydrotriazines, especially tris(N,N-dimethylaminopropyl)-s-hexahydrotriazine, tetraalkylammonium hydroxides such as tetramethylammonium dydroxide, alkali hydroxides such as sodium hydroxide and alkali alcoholates such as sodium methylate and potassium isopropylate as well as alkali salts of long-chain fatty acids with 10 to 20 carbons and optionally OH side groups. An effective amount of catalyst to promote the reaction of isocyanate groups with the polyol, or with other isocyanate groups in the case of isocyanurates, is employed. 0.001 to 5 wt percent to 2 wt percent, catalyst or catalyst combination based on the weight of polyol composition is preferred.

Preferred trimerization (isocyanurate) catalysts are metal carboxylates such as potassium 2-ethylhexanoate and potassium acetate. The latter is advantageously utilized as a 40 weight percent solution in ethylene glycol. Mixtures of amine, tin, and potassium catalysts may be used.

A surface-active substance is generally necessary for production of high grade polyurethane foam according to the present invention, since in the absence of same, the foams may collapse. Examples of surface active substances include compounds that support the homogenization of the starting materials and are optionally also suitable for regulating the cell structure. Examples include emulsifiers such as the sodium salts of castor oil sulfates or of fatty acids as well as salts of fatty acids with amines, e.g., diethylamine oleate, diethanolamine stearate, diethanolamine ricinoleate, salts of sulfonic acid, e.g. alkali or ammonium salts of dodecylbenzenesulfonic acid or dinaphthylmethanedisulfonic acid and ricinoleic acid; surfactants such as siloxaneoxalkylene copolymers and other organopolysiloxanes, ethoxylated alkylphenols, ethoxylated fatty alcohols, paraffin oils, castor oil and ricinoleic acid esters, Turkey re-d oil and peanut oil as well as cell regulators such as paraffins, fatty alcohols and dimethyl polysiloxanes. Furthermore, the oligomeric acrylates with polyoxyalkylene and fluoroalkane side groups described above are also suitable for improving emulsification, the cell structure and/or for stabilizing the foam. These surface-active substances are generally used in amounts of 0.01 to 5 weight percent based on the weight of the polyol composition. The non-ionic surfactants such as the well-known silicones have been found particularly desirable.

Chain extenders/crosslinkers are optional but useful to help promote the formation of a rigid foam especially where low functional polyols are employed. Those which may be employed in the preparation of the polyurethane foams are generally low molecular weight compounds having at least two functional groups bearing active hydrogen and of molecular weight less than 400, preferably 60 to 300, atoms such as hydrazine, primary and secondary diamines, amino alcohols, amino acids, hydroxy acids, glycols, or mixtures thereof. Suitable chain extenders/crosslinkers include ethylene glycol, 1,3-propanediol, 1,10-decanediol, O-,m- and p-dihydroxycyclohexane, diethylene glycol, dipropylene glycol and preferably 1,4-butanediol, 1,6-hexanediol and bis(2-hydroxyethyl)hydrozuinone, triols such as 1,2,4- and 1,3,5-trihydroxcyclohexane, glycerol and trimethylolpropane and low molecular hydroxyl group-containing polyalkylene oxides based on ethylene oxide and/or 1,2-propylene oxide and the aforementioned diols and/or triols as initiator molecules.

In addition to the aforementioned diols and/or triols, or in mixture with them as chain extenders or crosslinking agents to produce the rigid polyurethane-foams according to this invention, it is also possible to use secondary aromatic diamines, primary aromatic diamines, 3,3'-di- and/or 3,3', 5,5'-tetraalkyl-substituted diaminodiphenylmethanes. Examples of such amines are found at columns 8–9 of U.S. Pat. No. 4,472,002, herein incorporated by reference.

A preferred group of chain-extending agents, if used, includes diethylene glycol, 1,4-butanediol and primary and secondary diamines such as phenylene diamine, 1,4-cyclohexane-bis-(methylamine), ethylenediamine, diethylenetriamine, N-(2-hydroxypropyl)ethylene-diamine, N,N'-di(2-hydroxypropyl)ethylenediamine, piperazine, and 2-methylpiperazine.

If chain extenders/crosslinkers are employed, they are used in amounts of 1 to 40 weight percent, preferably to 30 weight percent, more preferably 5 to 25 weight percent based on the weight of the polyol composition.

If desired, flame retardants may be incorporated in the foams. Among the flame retardants which may be employed are: pentabromodiphenyl oxide, dibromopropanol, tris(b-chloropropyl)phosphate, 2,2-bis(-bromoethyl) 1,3-propanediol, tetrakis(2-chloroethyl) ethyl diphosphate, bis-(2-chloroethyl) 2-chloroethylphosphonate, molybdenum trioxide, ammonium molybdate, ammonium phosphate, pentabromodiphenyl oxide, tricresylphosphate, hexabromocyclododecane and dibromoethyl dibromocyclohexane. The concentrations of flame retardant compounds which may be employed range from 1 to 25 parts per 100 parts of polyol mixture.

Optionally, other additives and/or processing aids may be incorporated into the reaction mixture to make the rigid polyurethane/polyisocyanurate foams of the invention. Examples include fillers, dyes, pigments, and hydrolysis preventing agents.

Suitable methods of preparation include the prepolymer technique wherein an excess of organic polyisocyanate is reacted with a polyol to prepare a prepolymer having free isocyanate reactive groups, which is then reacted with a mixture of water, surfactant, and catalyst to obtain the foam. Alternatively, one may employ the quasi-prepolymer technique common in the preparation of rigid foams by reacting only a part of the polyol with the organic polyisocyanate to obtain a quasi-prepolymer, which is then reacted with the remaining portion of polyol in the presence of water, surfactant, and catalyst. Another option is to prepare a foam by reacting all the components in a single working step known as the "one-shot" method. In the one-shot method, the components may be mixed in a mix head or by impingement mixing.

The polyurethane components combined by any one of the above-mentioned techniques may be poured or sprayed into the cavity or surface defect.

The rigid foams of the invention are characterized as having a ratio of compressive strength to tensile strength of at least 0.5 or greater and generally an elongation of less than 10 percent.

The invention is further described below by way of illustration. The following is a description of the ingredients employed.

Polyol A is glycerine initiated all propylene oxide adduct having a hydroxyl number of 398 and commercially available from BASF Corporation under the name Plurarol® GP 430 polyol.

Polyol B is an ethylene diamine initiated all propylene oxide adduct having a hydroxyl number of 767 and commercially available from BASF Corporation under the name Quadrol® polyol.

Oil 1 is paraffinic based motor oil having trace amounts of aromatic hydrocarbons, a specific gravity of about 0.875, a V.I. of 197, and a flash point of 392° F., commercially available from Esso Petroleum Canada under the name Essolube HDX Plus 5W-30.

Oil 2 is a base stock severely hydrotreated paraffinic based oil containing less than 10 wt. percent carbon atoms in aromatic form having a flash point of 330° F., commercially available from PETROCANADA under the name Paraflex HT 32.

Lubrizol is an emulsifying agent having a specific gravity 0.905, a flash point of 356° C., commercially available from Lubrizol Canada Limited under the name Lubrizol LZ6420.

UCC 5420 is a silicone surfactant commercially available from Union Carbide.

ISO is a solvent-free polymethylene polyphenyl polyisocyanate with a functionality of about 2.7 and an NCO content of about 31.8 wt. percent commercially available from BASF Corporation under the name Lupranate® M-20S.

EXAMPLE 1

Various batches of resin corresponding to samples 1–5 were prepared by mixing Polyol A, Polyol B, Lubrizol, water and UCC 5420 using a Vollrath mixer at 1800 rpm for 60 seconds in a 1.0 (one) liter cup in the gram amounts shown in Table 1 below. The numerical ratios in parenthesis are in wt. percent. To each of the mixtures were blended Oil 2 and Oil 3 in the amounts shown in Table 1 and stirred for 300 seconds to produce a polyol composition-1 masterbatch.

In a dry 285 ml cup was added 40.0 grams of resin-1. To the cup containing the resin-1 was added 44.13 grams of ISO-A and mixed with a Vollrath mixer at 1800 rpm for ten (10) seconds. The blend was immediately transferred to a dry empty 285 ml cup, the foaming reaction was permitted to proceed freely, and the overall density of the foam prepared thereby was measured and recorded below as O.D.

The procedure was repeated as above, except that the empty cups to which the blend was transferred also contained 10 grams of water. The overall density of the foam produced thereby was measured and recorded below as O.D.W.

The same procedures as set forth above were repeated with Samples 2–5 and the densities recorded below. The percentage differences between the dry cup and the water containing cup shown below indicates that the oils employed protected the rigid foam systems from substantially reacting with the 10 grams of environmental water.

TABLE I

| SAMPLES | 1 | 2 | 3 | 4 | 5 |
|---|---|---|---|---|---|
| Polyol A | 168.75 (33.75) | 168.75 (33.75) | 168.75 (33.75) | 168.75 (33.75) | 168.75 (33.75) |
| Polyol B | 168.75 (33.75) | 168.75 (33.75) | 168.75 (33.75) | 168.75 (33.75) | 168.75 (33.75) |
| Oil 2 | 85.50 (17.10) | 76.50 (15.30) | 72.00 (14.40) | 67.50 (13.50) | 63.00 (12.60) |
| Oil 3 | 57.00 (11.40) | 51.00 (10.20) | 48.00 (9.60) | 45.00 (9.00) | 42.00 (8.40) |
| Lubrizol | 7.50 (1.50) | 22.50 (4.50) | 30.00 (6.00) | 37.50 (7.50) | 45.00 (9.00) |
| UCC 5420 | 10.00 (2.00) | 10.00 (2.00) | 10.00 (2.00) | 10.00 (2.00) | 10.00 (2.00) |
| Water | 2.50 (0.50) | 2.50 (0.50) | 2.50 (0.50) | 2.50 (0.50) | 2.50 (0.50) |
| Total | 500.00 (100.00) | 500 (100) | 500 (100) | 500 (100) | 500 (100) |
| ISO | 44.13 | 44.13 | 44.13 | 44.13 | 44.13 |
| Index | 110.00 | 110.00 | 110.00 | 110.00 | 110.00 |
| O.D. | 26.26 | 33.26 | 20.57 | 22.00 | 22.60 |
| O.D.W. | 22.00 | 28.69 | 18.00 | 19.00 | 18.00 |
| % Difference | 16.22% | 13.74% | 12.49% | 13.64% | 20.35% |

EXAMPLE 2

The same procedure followed in Example I was employed to prepare Samples 6–8 in the amounts shown in Table II below, except that Oil 1 was blended into the resin rather than Oils 2 and 3. The densities of the foams were measured and recorded below. As can be seen from the results in the table, Oil 1 was quite effective to protect the polyurethane system from reacting with environmental water.

TABLE II

| SAMPLE | 6 | 7 | 8 |
|---|---|---|---|
| POLYOL A | 474.84 (52.76) | 379.89 (42.21) | 316.62 (35.18) |
| POLYOL B | 158.31 (17.59) | 253.26 (28.14) | 316.53 (35.17) |
| UCCL 5420 | 16.20 (1.80) | 16.20 (1.80) | 16.20 (1.80) |
| WATER | 7.65 (0.85) | 7.65 (0.85) | 7.65 (0.85) |
| OIL 1 | 243.00 (27.00) | 243.00 (27.00) | 243.00 (27.00) |
| TOTAL | 900 (100) | 900 (100) | 900 (100) |
| ISO A | 110.48 | 110.46 | 110.73 |
| INDEX | 113.00 | 104.00 | 99.00 |
| O.D. | 14.80 | 21.00 | 22.50 |
| O.D.W. | 14.80 | 21.40 | 21.80 |
| % DIFFERENCE | 0.00 | −1.87 | 3.11 |

We claim:

1. A method of repairing a defect to a structural member comprising;
   (a) applying a polyurethane/polyisocyanurate composition to a defect, said defect having present environmental water and said polyurethane/polyisocyanurate composition comprised of an organic polyisocyanate, a lubricating oil, and a polyol composition comprising:
      (i) one or more compounds having at least two isocyanate reactive hydrogens;
      (ii) a blowing agent comprised of water; and,
      (iii) optionally a polyurethane promoting catalyst, a surfactant, emulsifier, crosslinker, and/or trimerization catalyst; said lubricating oil comprised of a base stock having at least 55 weight percent carbon atoms in paraffinic form and no more than 10 weight percent carbon atoms in aromatic form; and,
   (b) foaming said composition to form a rigid polyurethane/polyisocyanurate foam.

2. The method of claim 1, wherein the amount of said oil is from 10 weight percent to 50 weight percent based on the weight of said polyol composition.

3. The method of claim 1, wherein the amount of said oil is from 20 weight percent to 35 weight percent based on the weight of said polyol composition.

4. The method of claim 1, wherein the blowing agent consists of water.

5. The method of claim 4, wherein the amount of water is from 0.01 to 1.0 weight percent based on the weight of the polyol composition.

6. The method of claim 1, wherein the obtained foam has a density variant no greater than 20 percent.

7. The method of claim 6, wherein the obtained foam has a density variant no greater than 5 percent.

8. The method of claim 1, wherein the base stock contains less than 7 weight percent aromatic hydrocarbons based on the weight of the base stock.

9. The method of claim 1, wherein the base stock has no more than 20 weight percent carbon atoms in naphthenic form based on the weight of the base stock.

10. The method of claim 1, wherein the base stock has a viscosity index in the range of from 95 to 105.

11. The method of claim 1, wherein the lubricating oil consists essentially of a motor grade oil base stock having a specific gravity no greater than 0.9050.

12. The method of claim 11, wherein the lubricating oil consists essentially of a motor grade oil base stock having a specific gravity no greater than 0.8900 and a Cleveland Open Cup flash point of at least 320° F.

13. The method of claim 1, wherein the lubricating oil further contains 2 weight percent to 20 weight percent additives.

14. The method of claim 8, wherein the hydrocarbon oil is a motor oil within an SOCIETY OF AUTOMOTIVE ENGINEERS classification from 5W to 50.

15. The method of claim 1, wherein the component (i) consists essentially of a polyoxypropylene polyether polyol.

16. The method of claim 1, wherein the lubricating oil is added to the organic polyisocyanate prior to reaction with the polyol composition.

17. The method of claim 1, wherein the lubricating oil added to the polyol composition prior to reacting with the organic polyisocyanate.

18. The method of claim 1, wherein the rigid polyurethane/polyisocyanurate composition is poured or sprayed in the defect.

19. The method of claim 1, wherein the structural member comprises a wood hydropole, a railroad tie, or a roof.

* * * * *